US008008634B2

(12) United States Patent
Sakurai et al.

(10) Patent No.: US 8,008,634 B2

(45) Date of Patent: Aug. 30, 2011

(54) RADIATION IMAGE CONVERTING PANEL

(75) Inventors: Jun Sakurai, Hamamatsu (JP); Ichinobu Shimizu, Hamamatsu (JP); Gouji Kamimura, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 12/910,370

(22) Filed: Oct. 22, 2010

(65) Prior Publication Data

US 2011/0031415 A1 Feb. 10, 2011

Related U.S. Application Data

(63) Continuation of application No. 12/332,445, filed on Dec. 11, 2008, now abandoned.

(30) Foreign Application Priority Data

Apr. 21, 2008 (JP) ................................ P2008-110376

(51) Int. Cl.
*G03B 42/08* (2006.01)

(52) U.S. Cl. ........................................ 250/483.1; 427/65

(58) Field of Classification Search ............... 250/483.1; 427/65

See application file for complete search history.

(56) References Cited

U.S. PATENT DOCUMENTS

| | | | |
|---|---|---|---|
| 2003/0042429 | A1 | 3/2003 | Isoda |
| 2004/0146639 | A1 | 7/2004 | Isoda |
| 2007/0205371 | A1 | 9/2007 | Inoue |

FOREIGN PATENT DOCUMENTS

| | | |
|---|---|---|
| EP | 1830226 A1 | 9/2007 |
| JP | 2003-028994 | 1/2003 |
| JP | 2005-091146 | 4/2005 |
| JP | 2005-091148 | 4/2005 |

*Primary Examiner* — Constantine Hannaher

(74) *Attorney, Agent, or Firm* — Drinker Biddle & Reath LLP

(57) ABSTRACT

A radiation image converting panel has a structure capable of arbitrarily controlling a change in luminance distribution of an entire panel surface after formation of a moisture-resistant protective film. The radiation image converting panel comprises a radiation converting film doped with Eu and covered with a moisture-resistant protective film. The Eu concentration in the radiation converting film is preliminarily adjusted such that the Eu concentration at a central portion or peripheral portion of the film falls within an optimal range, and the other film portion is provided with a positive or negative concentration gradient such that the Eu concentration thereof gradually become higher or lower than the optimal range. The luminance distribution of the entire panel in which the moisture-resistant protective film has been formed can be controlled by providing the Eu concentration to be added with a concentration gradient.

13 Claims, 11 Drawing Sheets

Fig.1A
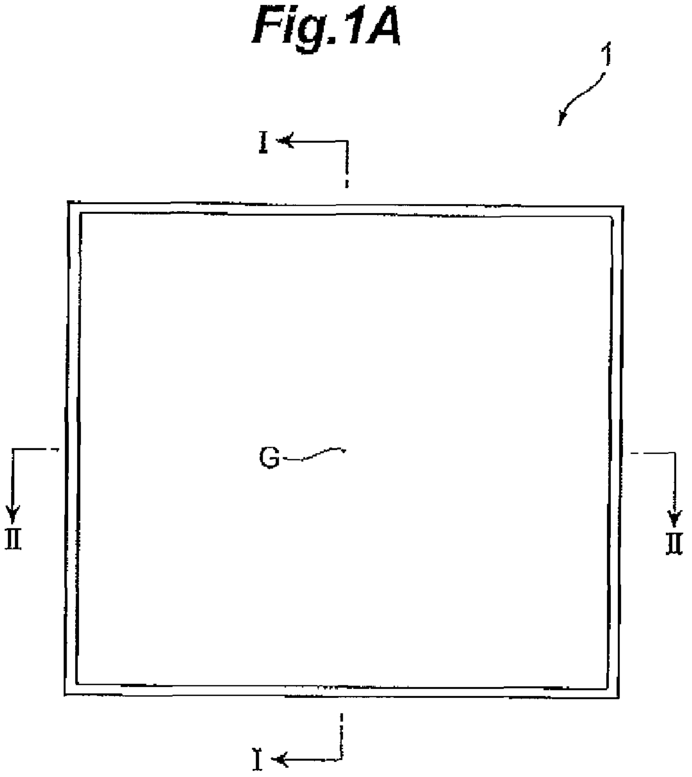
Fig.1B
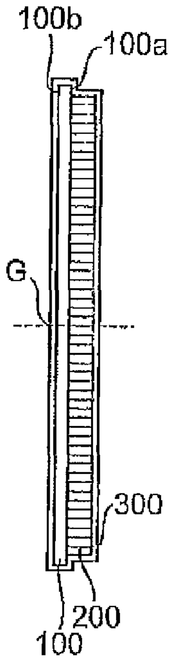
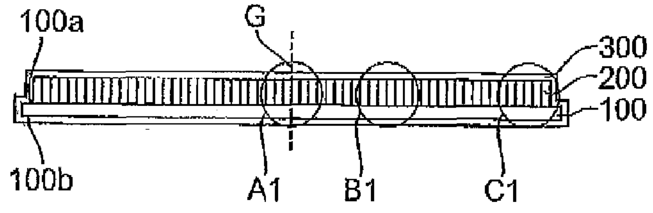
Fig.1C

RADIATION IMAGE CONVERTING PANEL

This is a continuation application of prior application Ser. No. 12/332,445, filed on Dec. 11, 2008 now abandoned, which is incorporated by reference herein in its entirety.

BACKGROUND OF THE INVENTION

1. Field of the Invention

The present invention relates to a radiation image converting panel comprising a radiation converting film having a columnar crystal structure, which converts an incident radiation ray to a visible light.

2. Related Background Art

Radiation images typified by X-ray images have conventionally been widely used for a purposes such as disease diagnosis. As a technique for obtaining such a radiation image, for example, a radiation image recording and reproducing technique using a radiation converting film that accumulates and records irradiated radiation energy, and also emits a visible light according to radiation energy accumulated and recorded as a result of irradiating an excitation light has been widely put into practical use.

A radiation image converting panel to be applied to such a radiation image recording and reproducing technique as this includes a support body and a radiation converting film provided on the support body. As the radiation converting film, a photostimulable phosphor layer having a columnar crystal structure formed by vapor-phase growth (deposition) has been known. When the photostimulable phosphor layer has a columnar crystal structure, since a photostimulable excitation light or photostimulable emission is effectively suppressed from diffusing in the horizontal direction (reaches the support body surface while repeating reflection at crack (columnar crystal) interfaces), this allows remarkably increasing the sharpness of an image by photostimulable emission.

For example, Japanese Patent Application Laid-Open No. 2003-028994 (Document 1) describes a technique that reduces a luminance unevenness by uniforming a concentration distribution of activator along a film thickness direction of phosphor layer. On the other hand, Japanese Patent Application Laid-Open No. 2005-091146 (Document 2) describes a technique that reduces a luminance unevenness by uniforming a concentration distribution of activator in a phosphor layer.

SUMMARY OF THE INVENTION

The present inventors have examined the conventional radiation image converting panels in detail, and as a result, have discovered the following problems.

Namely, the conventional radiation image converting panels are manufactured by a moisture-resistant protective film covering a surface of a phosphor layer formed on a support body. At the time of forming the phosphor layer, an activator with a concentration most appropriate to an emission is added in the phosphor layer to be manufactured, but a change of luminance distribution occurs after formation of the moisture-resistant protective film In concrete terms, since the luminance of the periphery of the phosphor layer relatively increases with respect to the luminance of the vicinity of center of the phosphor layer, a luminance unevenness occurs in the entire panel.

Both Documents 1 and 2 has a problem such that a luminance distribution is changed after formation of a moisture-resistant protective film due to an non-uniformity of columnar crystals. In addition, a technique for arbitrarily controlling a luminance distribution of an entire panel surface after formation of a moisture-resistant protective film is not established.

The present invention has been developed to eliminate the problems described above. It is an object of the present invention to provide a radiation image converting panel with a structure capable of arbitrarily controlling a luminance distribution of an entire panel surface after formation of a moisture-resistant protective film to be provided on the surface of a radiation converting film, by using a change of the luminance distribution that is occurred due to the formation of the moisture-resistant protective film.

A radiation image converting panel according to the present invention has been completed by the inventors' focusing to the characteristics of the radiation image converting panel such that a luminance distribution of the entire panel is changed after formation of a moisture-resistant protective film. In concrete terms, a radiation image converting panel comprises a support body, a radiation converting film formed on the support body, and a moisture-resistant protective film covering the radiation converting film. The support body includes a parallel plate having a first main surface and a second main surface opposing the first main surface. The radiation converting film is formed on a film forming region which exists within the first main surface of the support body and includes at least a gravity center position of the first main surface. The radiation converting film is a photostimulable phosphor layer doped with Eu as an activator, and is constituted by columnar crystals which are coincident or tilted at a predetermined angle with respect to a normal direction of the first main surface. The moisture-resistant protective film is preferably a transparent organic film that covers an exposed surface of said radiation converting film without a surface that is covered by the first main surface of the support body.

Particularly, over the entire radiation converting film, the Eu concentration falls within the range of 0.01 wt % or more but 0.5 wt % or less, preferably the range of 0.01 wt % or more but 0.3 wt % or less. In addition, the Eu concentration distribution in the radiation converting film has a concentration gradient along the direction from the radiation converting film (central portion) located on the vicinity of gravity center position toward the peripheral portion of the film.

In concrete terms, in the film forming region of the first main surface, the Eu concentration of the radiation converting film, which locates on a central area, is set in an optimal range capable of obtaining a sufficient emission, or the Eu concentration of the radiation converting film, which locates on a peripheral area, is set in the optimal range. At this time, the optimal range is 0.01 wt % or more but 0.07 wt % or less. Also, in the case that the Eu concentration of the radiation converting film located on the central area is set in the optimal range, the Eu concentration distribution is provided with a concentration gradient by setting the Eu concentration of the radiation converting film located on the peripheral area so as to become higher than the optimal Eu concentration (first concentration pattern), or inversely setting it so as to become lower than the optimal Eu concentration (second concentration pattern). On the other hand, in the case that the Eu concentration of the radiation converting film located on the peripheral area is set in the optimal range, the Eu concentration distribution may be provided with a concentration gradient by setting the Eu concentration of the radiation converting film located on the central area so as to become higher than the optimal Eu concentration (third concentration pattern), or inversely setting it so as to become lower than the optimal Eu concentration (fourth concentration pattern).

Here, in the case that the Eu concentration of the radiation converting film located on the central area is relatively lower than the Eu concentration of the radiation converting film located on the peripheral area, it is preferable that the Eu concentration distribution, which locates on a middle area sandwiched by the central area and the peripheral area, monotonically decreases along a direction directing from the gravity center position to the edge of the film forming region, in the film forming region of the first main surface. Reversely, in the case that the Eu concentration of the radiation converting film located on the central area is relatively higher than the Eu concentration of the radiation converting film located on the peripheral area, it is preferable that the Eu concentration distribution, which locates on a middle area sandwiched by the central area and the peripheral area, monotonically increases along a direction directing from the gravity center position to the edge of the film forming region, in the film forming region of the first main surface.

Among the above described first to fourth concentration distribution patterns, the first and second concentration distribution patterns are an effective concentration distribution pattern when pointing up the luminance of the radiation converting film located on the central area. On the other hand, the third and fourth concentration distribution patterns are an effective concentration distribution pattern when pointing up the luminance of the radiation converting film located on the peripheral area.

Furthermore, in the first and third concentration distribution patterns, the Eu concentration of the radiation converting film located on the peripheral area may be set at the value of 0.3 times or more but 0.8 times or less than the Eu concentration of the radiation converting film located on the central area. In this case, by the moisture-resistant protective film formed so as to cover the radiation converting film (formed on the film formatting region in the first main surface of the support body), the entire luminance distribution of the manufactured radiation image converting panel can be made be uniform from a panel gravity center toward a panel edge.

Here, the central area is defined as an area around the gravity center position whose radius equals 5% or less of a minimum distance from the gravity center position to an edge of the film forming region, in the film forming region of the first main surface. The peripheral area is defined as an area sandwiched by the edge of the film forming region and a circumference of a reference circle centering the gravity center position whose radius equals 40% or more but 80% or less of the minimum distance from the gravity center position to the edge of the film forming region.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will be apparent to those skilled in the art from this detailed description.

BRIEF DESCRIPTION OF THE DRAWINGS

FIGS. 1A to 1C are views showing a structure of an embodiment of a radiation image converting panel according to the present invention;

DESCRIPTION OF THE PREFERRED EMBODIMENTS

Figure 2A:
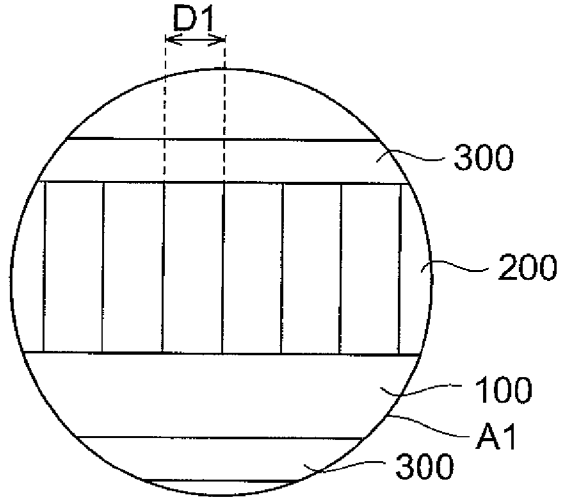
FIGS. 2A to 2C are views showing sectional structures of respective parts in a radiation converting film of a radiation image converting panel according to the present invention.

In the following, embodiments of a radiation image converting panel according to the present invention will be explained in detail with reference to FIGS. 1A to 2C, 3 to 7, 8A to 10B, and 11. In the description of the drawings, identical or corresponding components are designated by the same reference numerals, and overlapping description is omitted.

FIGS. 1A to 1C are views showing a structure of an embodiment of a radiation image converting panel according to the present invention. In particular, FIG. 1A is a plan view of the radiation image converting panel 1, FIG. 1B is a sectional view of the radiation image converting panel 1 along the line I-I in FIG. 1A, and FIG. 1C is a sectional view of the radiation image converting panel 1 along the line II-II in FIG. 1A.

In FIGS. 1A to 1C, the radiation image converting panel 1 comprises a support body 100, a radiation converting film 200 formed on the support body 100, and a protective film 300 (transparent organic film) that entirely covers the support body 100 and the radiation converting film 200. The support body 100 is a parallel plate having a first main surface 100*a* on which the radiation converting film 200 is formed and a second main surface 100*b* opposing the first main surface 100*a*. The radiation converting film 200 is formed on a film forming region R, and the film forming region R exists within the first main surface 100*a* of the support body 100 and includes at least a gravity center position G of the first main surface 100*a*. This radiation converting film 200 is comprised of columnar crystals which are coincident or tilted at a predetermined angle with respect to a normal direction of the first main surface 100*a*.

Figure 2B:
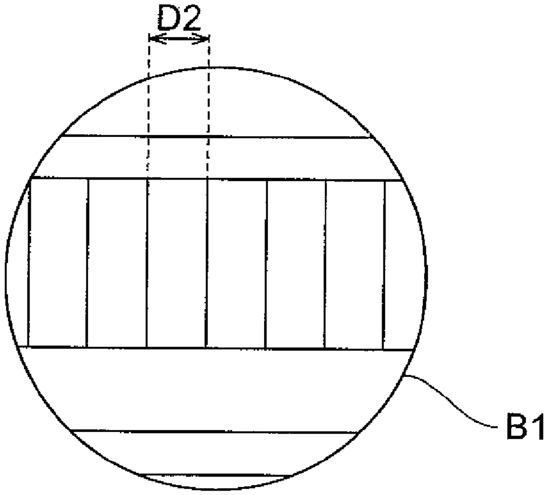
Figure 2C:
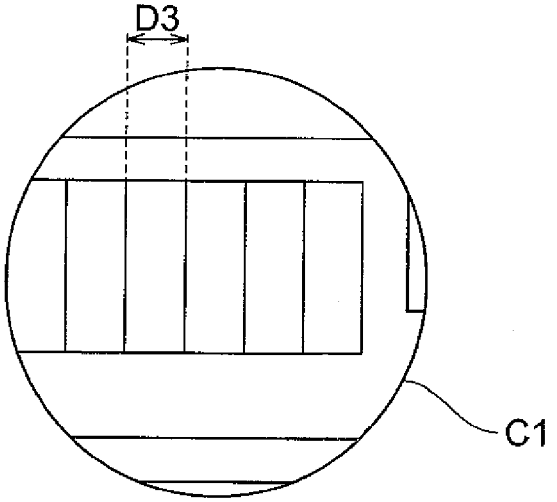

FIGS. 2A to 2C are views showing sectional structures of respective parts in a radiation converting film according to the present invention. In concrete terms, FIG. 2A is a sectional view of a region A1 in FIG. 1C, FIG. 2B is a sectional view of a region B1 in FIG. 1C, and FIG. 2C is a sectional view of a region C1 in FIG. 1C.

As can be understood from FIGS. 2A to 2C, the crystal diameters D1 to D3 of columnar crystals that form the radiation converting film 200 are all approximately 7 μm, which are almost uniform across the entire surface of the radiation converting film 200. However, the radiation converting film 200 has been doped with Eu being an activator, and the Eu has been doped so that Eu concentration gradually increases from the vicinity of the center toward the periphery of the radiation converting film 200. Although it has been discovered by the inventors that the Eu concentration contributes to suppression of a drop in luminance of the panel, by setting the Eu concentration high in the periphery where a drop in luminance is significant in comparison with the vicinity of the center, a sufficient fluorescence lifetime of the panel as a whole can be maintained.

Figure 3:
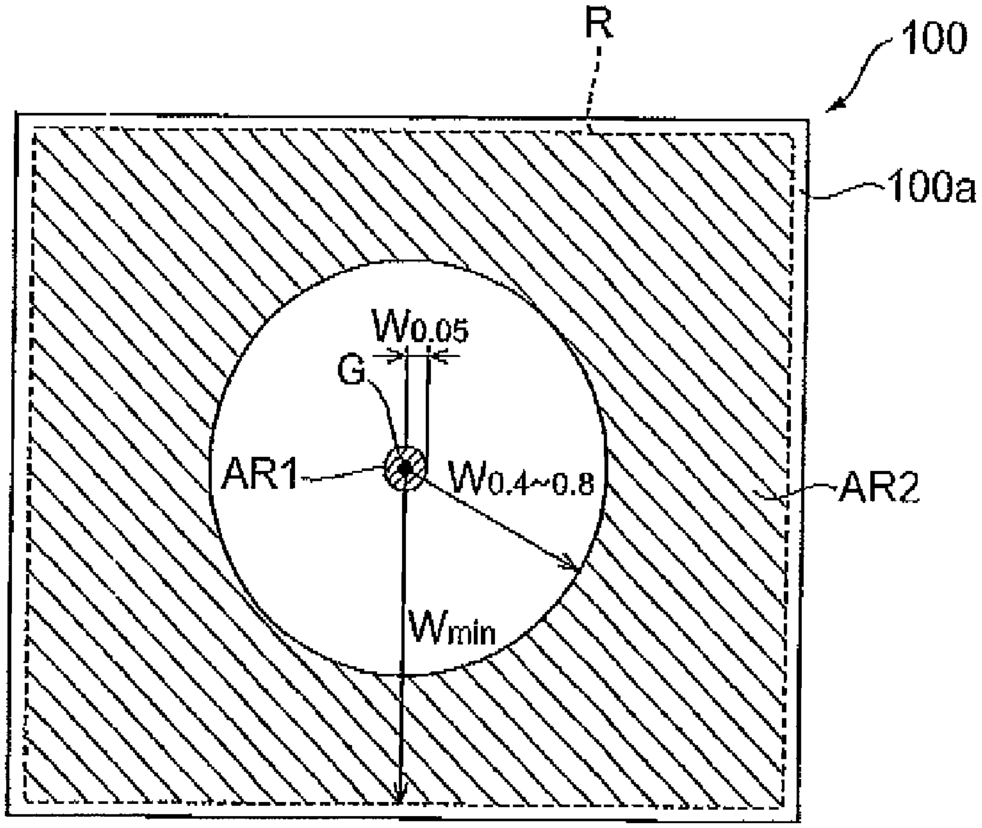
FIG. 3 is a view for concretely explaining a method for specifying a central area and a peripheral area on the first main surface of a support body.

Next, by use of FIG. 3, description will be given, in terms of a film forming region R in the first main surface 100*a* of the support body 100, of a central area AR1 and a peripheral area AR2 of the film forming region R for defining an Eu concentration distribution of the radiation converting film 200 to be formed on the film forming region R. FIG. 3 is a view for concretely explaining a method for specifying a central area AR1 and a peripheral area AR2 in the first main surface 100*a* (film forming region R) of the support body 100.

The central area AR1 in the film forming region R is a local region including the gravity center position G. In concrete team, this is a local region including the gravity center position G where a distance from the gravity center position G equals 5% of the minimum distance from the gravity center position G to an edge of the film forming region R (inside of a reference circle centering the gravity center position G whose radius equals 5% of the minimum distance). On the other hand, the peripheral area AR2 in the film forming region R is a local region sandwiched by the edge of the film forming region R and the circumference of a reference circle whose radius equals 40% to 80% of the minimum distance from the gravity center position G to an edge of the film forming region R. In addition, the radius equaling 5% of the minimum distance is indicated by $W_{0.05}$, the radius equaling 40% of the minimum distance is indicated by $W_{0.4}$, and the radius equaling 80% of the minimum distance is indicated by $W_{0.8}$ Also, the radiation converting film 200 is formed on the film forming region R of the first main surface 100*a* where the central area AR1 and the peripheral area AR2 are thus defined, and the vicinity of the center and periphery of the radiation converting film 200 may be considered as regions substantially coincident with the central area AR1 and the peripheral area AR2 defined in FIG. 3, respectively.

Figure 4:
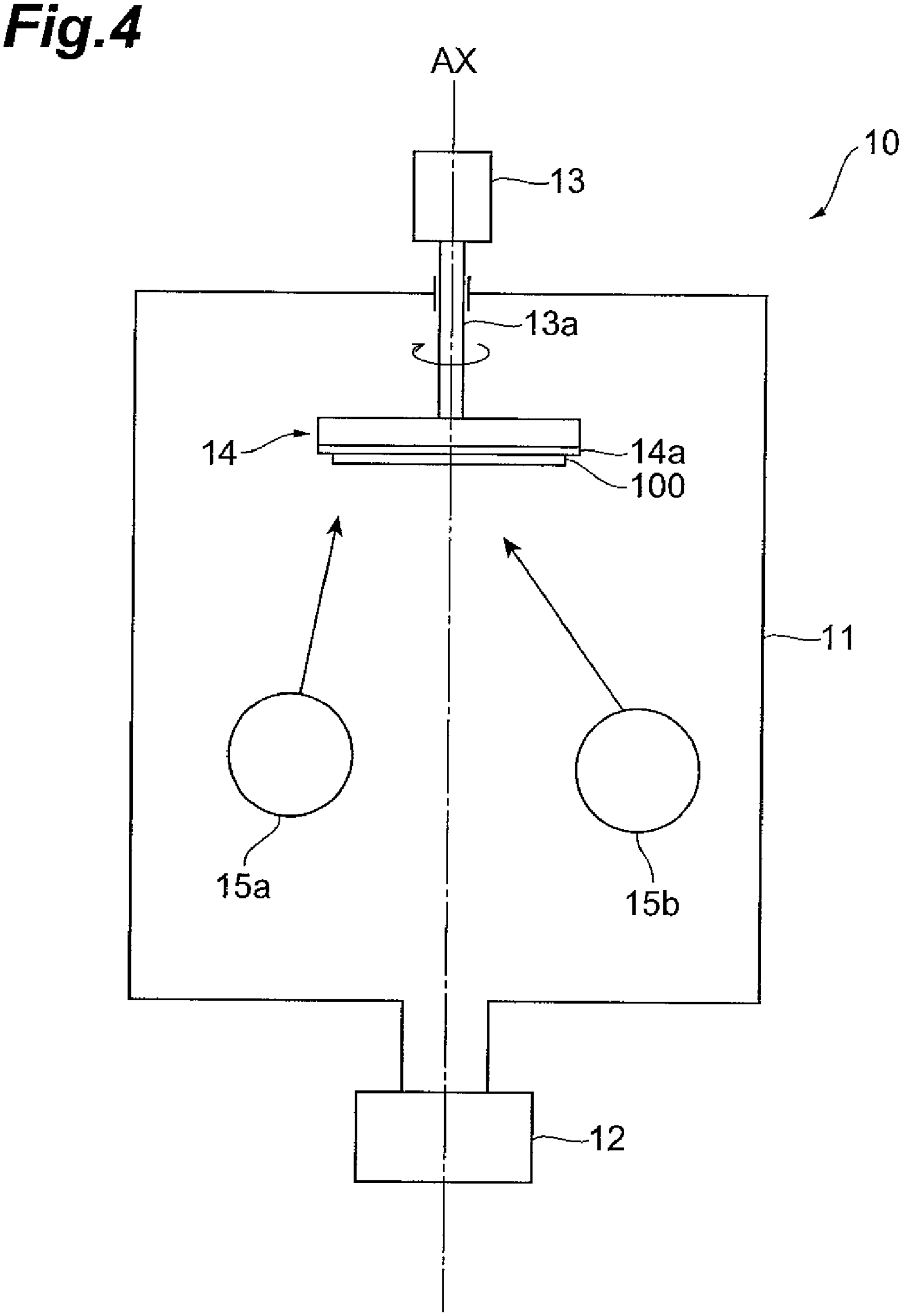
FIG. 4 is a view showing a configuration of a manufacturing apparatus for forming, on a support body, a radiation converting film, as a part of the manufacturing process of a radiation image converting panel according to the present invention (first and third concentration distribution patterns)

Next, FIG. 4 is a view showing a configuration of a manufacturing apparatus for forming, on the support body 100, a radiation converting film 200 of the radiation image converting panel according to the present invention.

The manufacturing apparatus 10 shown in FIG. 4 is an apparatus that forms a radiation converting film 200 on the first main surface 100*a* of the support body 100 by a vapor-phase deposition method. As the vapor-phase deposition method, a vapor deposition method, a sputtering method, a CVD method, an ion plating method, or the like is applicable, and description will be given for, as an example, a case where the radiation converting film 200 of Eu-doped CsBr is formed on the support body 100 by a vapor deposition method. This manufacturing apparatus 10 comprises, at least, a vacuum container 11, a support body holder 14, a rotary shaft 13*a*, a drive unit 13, phosphor evaporation sources 15*a* and 15*b*, and a vacuum pump 12. The support body holder 14, the evaporation source 15, and a part of the rotary shaft 13*a* are arranged in the vacuum container 11. The support body holder 14 includes a heater 14*a* to heat the support body 100. One end of the rotary shaft 13*a* extended from the drive unit 13 is attached to the support body holder 14, and the drive unit 13 rotates the support body holder 14 via the rotary shaft 13*a*. Each of the phosphor evaporation sources 15*a* and 15*b*, which is arranged at a position deviated from a center axis AX of the vacuum container 11, holds a metal material supplied as a metal vapor to be vapor-deposited on the support body 100 installed on the support body holder 14. The vacuum pump 12 depressurizes the interior of the vacuum container 11 to a predetermined degree of vacuum.

In each of the phosphor evaporation sources 15*a* and 15*b*, a mixture material of CsBr and EuBr is set, however, concentration of the Eu serving as an activator is set higher in the phosphor evaporation source 15*b* than that in the phosphor evaporation source 15*a*. Moreover, in the manufacturing apparatus 10, the phosphor evaporation sources 15*a* and 15*b* are disposed so as to provide the Eu concentration distribution with a negative concentration gradient along the direction from the central area AR1 toward the peripheral area AR2 of the support body 100. In other words, the phosphor evaporation source 15*a* is set so that the inflow direction of a metal vapor points to the central area AR1 of the support body 100 from the position off the axis AX, while the phosphor evaporation source 15*b* is set so that the inflow direction of a metal vapor points to the peripheral area AR2 of the support body 100. The support body 100 is set on the support body holder 14. The crystal diameter of columnar crystals to be formed on a surface, of the support body 100, facing the phosphor evaporation sources 15*a* and 15*b* is adjusted by adjusting the temperature of the support body 100 itself with the heater 14*a*, and by controlling the degree of vacuum in the vacuum container 11, an inflow angle of the metal vapor from the material sources 15*a* and 15*b* to the support body 100, and the like.

First, columnar crystals of Eu-doped CsBr are grown on the first main surface 100*a* (the surface facing the phosphor evaporation sources 15*a* and 15*b*) of the support body 100 by a vapor deposition method. At this time, the drive unit 13 is rotating the support body holder 14 via the rotary shaft 13*a*, and accordingly, the support body 100 is also rotating around the axis AX.

By such a vapor deposition method, a radiation converting film 200 with a film thickness of 500 μm±50 μm is formed on the support body 100. At this time, the crystal diameter of columnar crystals in the radiation converting film 200 is approximately 3-10 μm. Moreover, the Eu concentration of the radiation converting film 200 located on the central area AR1 is provided with a concentration gradient (negative concentration gradient) so as to become higher than the Eu concentration of the radiation converting film 200 located on the peripheral area AR2. At this time, As an entire radiation converting film 200, the Eu concentration is set at one value of 0.1 wt % to 0.5 wt %, but the Eu concentration of the radiation converting film 200 located on one of the central area AR1 or the peripheral area AR2 is set so as to fall within the optimal concentration range of 0.01 wt % or more but 0.07 wt % or less. Also, the Eu concentration of the radiation converting film 200 located on the peripheral area AR2 is 0.3 times to 0.8 times of the Eu concentration of the radiation converting film 200 located on the central area AR1.

The CsBr being a material of the radiation converting film 200 formed on the support body 100 as described above is highly hygroscopic. The radiation converting film 200 absorbs vapor in the air to deliquesce when this is kept exposed. Therefore, subsequent to the forming step of the radiation converting film 200 by a vapor deposition method, a moisture-resistant protective film 300 is formed by a CVD method so as to cover an exposed surface as a whole of the radiation converting film 200. More specifically, the support body 100 on which the radiation converting film 200 has been formed is placed in a CVD apparatus, and a moisture-resistant protective film 300 with a film thickness of approximately 10 μm is formed on the exposed surface of the radiation converting film 200. Thereby, the radiation image converting panel 1 for which the moisture-resistant protective film 300 has been formed on the radiation converting film 200 and the support body 100 is obtained.

Figure 5:
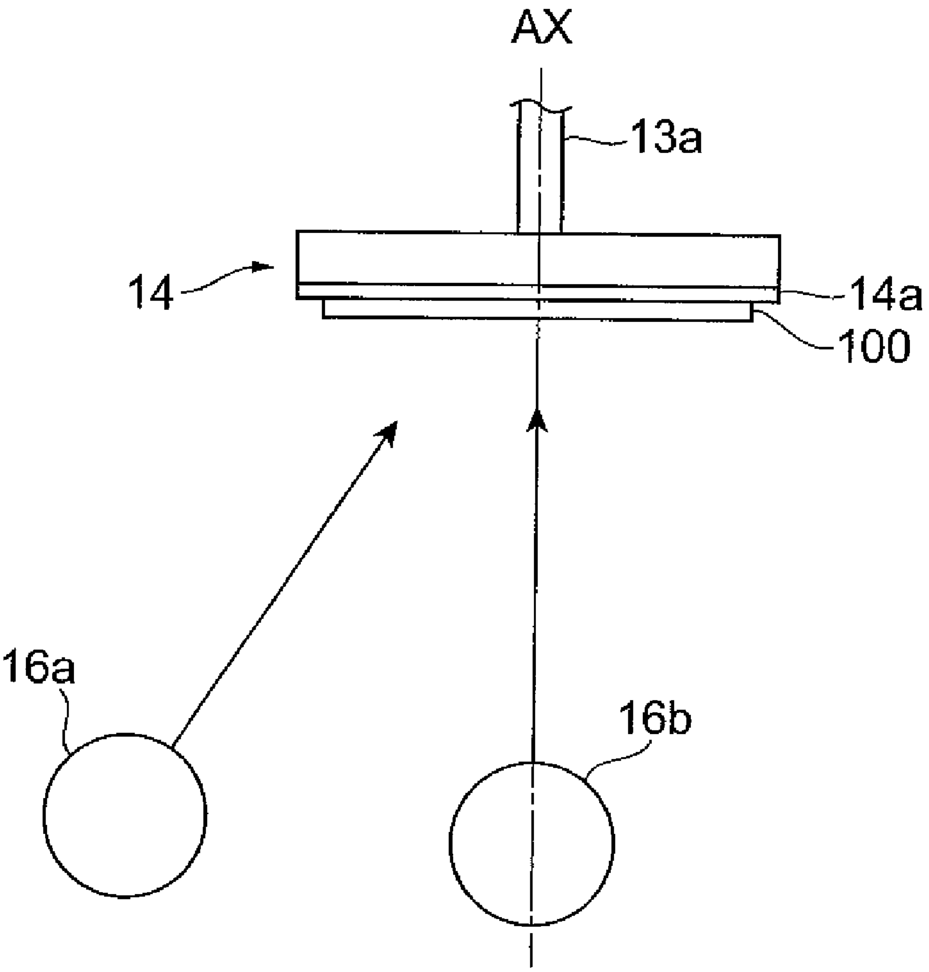
FIG. 5 is a view showing another configuration of a manufacturing apparatus for forming, on a support body, a radiation converting film, as a part of the manufacturing process of a radiation image converting panel according to the present invention (first and third concentration distribution patterns)

Control of the Eu concentration in the radiation converting film 200 to be formed on the support body 100 is realized not only by the arrangement of the phosphor evaporation sources 15*a* and 15*b* as shown in FIG. 4, but this can also be realized by an arrangement shown in FIG. 5. Namely, as described above, the concentration distribution of Eu to be added within the radiation converting film 200 can be provided with a negative concentration gradient along the direction from the central area AR1 toward the peripheral area AR2 by using the phosphor evaporation sources 16*a* and 16*b*.

More specifically, in the vacuum container 11, as shown in FIG. 5, a base material evaporation source 16*a* and an activator evaporation source 16*b* may be arranged at positions off the axis AX. In the base-material evaporation source 16*a*, CsBr is set, and in the activator evaporation source 16*b*, EuBr is set. Also, the base material evaporation source 16*a* is set so that the inflow direction of a metal vapor points to a middle area sandwiched by the central area AR1 and the peripheral area AR2. The activator evaporation source 16*b* is set so that that the inflow direction of a metal vapor becomes coincident to the central axis AX (perpendicular to the support body 100). In the case where the base material evaporation source 16*a* and the activator evaporation source 16*b* are thus arranged as well, similar to the manufacturing apparatus 10 shown in FIG. 4, it is possible to control the Eu concentration (to provide a negative concentration gradient along the direction from the center toward the periphery of the radiation converting film 200).

Figure 6:
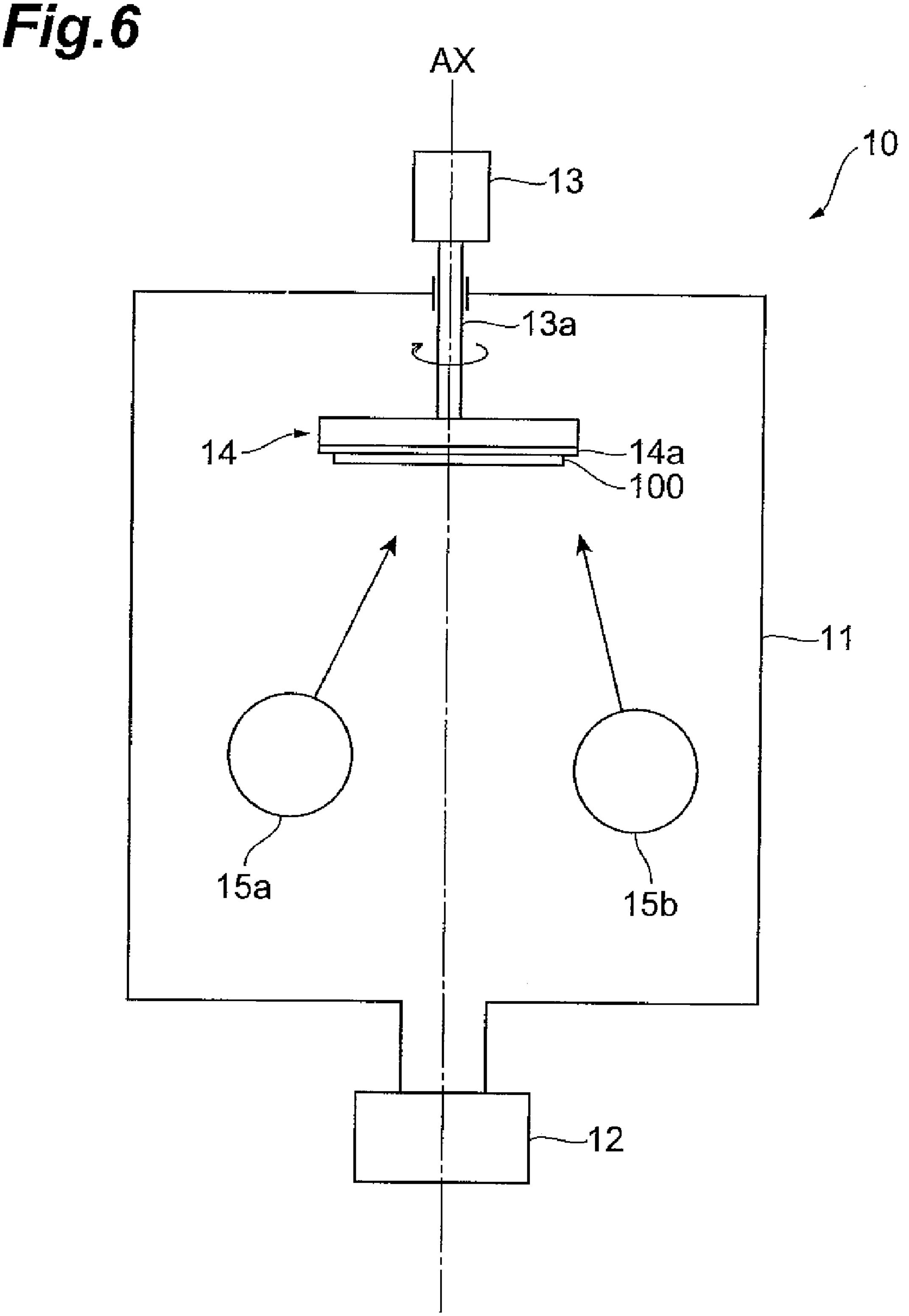
FIG. 6 is a view showing a configuration of a manufacturing apparatus for forming, on a support body, a radiation converting film, as a part of the manufacturing process of a radiation image converting panel according to the present invention (second and fourth concentration distribution patterns)
Figure 7:
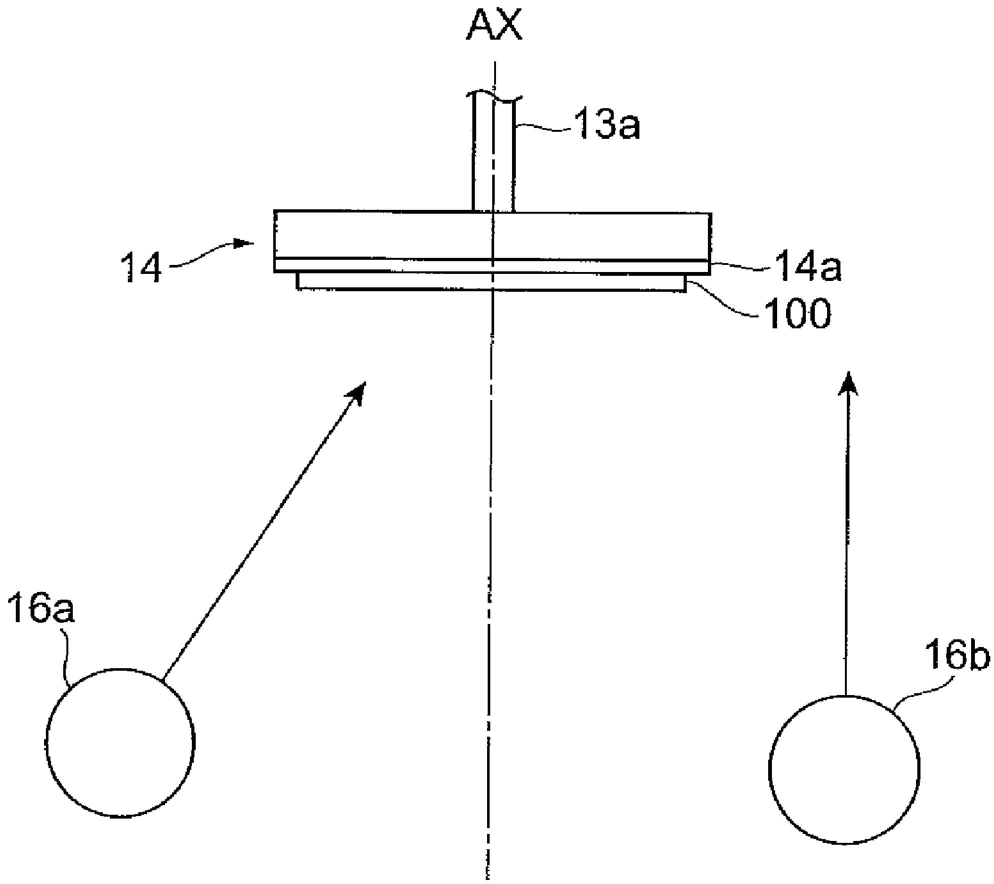
FIG. 7 is a view showing another configuration of a manufacturing apparatus for forming, on a support body, a radiation converting film, as a part of the manufacturing process of a radiation image converting panel according to the present invention (second and fourth concentration distribution patterns)

On the other hand, the radiation converting film 200 can be provided with a positive concentration gradient along the direction from the center toward the periphery of the radiation converting film 200. This matter can be realized by a manufacturing apparatus as shown in FIGS. 6 and 7. Meantime, the manufacturing apparatus 10 shown in FIG. 6 has a substantially same structure as the manufacturing apparatus 10 shown in FIG. 4, but the locations of the phosphor evaporation sources 15*a* and 15*b* are different from those shown in FIG. 4.

In each of the phosphor evaporation sources 15*a* and 15*b*, a mixture material of CsBr and EuBr is set, however, concentration of the Eu serving as an activator is set higher in the phosphor evaporation source 15*b* than that in the phosphor evaporation source 15*a*. Moreover, in the manufacturing apparatus 10 as shown in FIG. 6, the phosphor evaporation sources 15*a* and 15*b* are disposed so as to provide the Eu concentration distribution with a positive concentration gradient along the direction from the central area AR1 toward the peripheral area AR2 of the support body 100 (second and fourth concentration distribution patterns). In other words, the phosphor evaporation source 15*a* is set so that the inflow direction of a metal vapor points to the central area AR1 of the support body 100 from the position off the axis AX, while the phosphor evaporation source 15*b* is set so that the inflow direction of a metal vapor points to the peripheral area AR2 of the support body 100. The support body 100 is set on the support body holder 14. The crystal diameter of columnar crystals to be formed on a surface, of the support body 100, facing the phosphor evaporation sources 15*a* and 15*b* is adjusted by adjusting the temperature of the support body 100 itself with the heater 14*a*, and by controlling the degree of vacuum in the vacuum container 11, an inflow angle of the metal vapor from the material sources 15*a* and 15*b* to the support body 100, and the like.

First, columnar crystals of Eu-doped CsBr are grown on the first main surface 100*a* (the surface facing the phosphor evaporation sources 15*a* and 15*b*) of the support body 100 by a vapor deposition method. At this time, the drive unit 13 is rotating the support body holder 14 via the rotary shaft 13*a*, and accordingly, the support body 100 is also rotating around the axis AX.

By such a vapor deposition method, a radiation converting film 200 with a film thickness of 500 μm±50 μm is formed on the support body 100. At this time, the crystal diameter of columnar crystals in the radiation converting film 200 is approximately 3-10 μm. Moreover, the Eu concentration of the radiation converting film 200 located on the central area AR1 is provided with a concentration gradient (positive concentration gradient) so as to become lower than the Eu concentration of the radiation converting film 200 located on the peripheral area AR2. At this time, As an entire radiation converting film 200, the Eu concentration is set at one value of 0.1 wt % to 0.5 wt %, but the Eu concentration of the radiation converting film 200 located on one of the central area AR1 or the peripheral area AR2 is set so as to fall within the optima range of 0.01 wt % or more but 0.07 wt % or less.

Subsequently, a moisture-resistant protective film 300 is formed by a CVD method so as to cover an exposed surface as a whole of the radiation converting film 200. More specifically, the support body 100 on which the radiation converting film 200 has been formed is placed in a CVD apparatus, and a moisture-resistant protective film 300 with a film thickness of approximately 10 μm is formed on the exposed surface of the radiation converting film 200. Thereby, the radiation image converting panel 1 for which the moisture-resistant protective film 300 has been formed on the radiation converting film 200 and the support body 100 is obtained.

Control of the Eu concentration in the radiation converting film 200 to be formed on the support body 100 is realized not only by the arrangement of the phosphor evaporation sources 15*a* and 15*b* as shown in FIG. 6, but this can also be realized by an arrangement shown in FIG. 7. Namely, the concentration distribution of Eu to be added within the radiation converting film 200 can be provided with a positive concentration gradient along the direction from the central area AR1 toward the peripheral area AR2 by using the phosphor evaporation sources 16*a* and 16*b* as shown in FIG. 7.

In the vacuum container 11, as shown in FIG. 7, a base material evaporation source 16*a* and an activator evaporation source 16*b* may be arranged at positions off the axis AX. In the base-material evaporation source 16*a*, CsBr is set, and in the activator evaporation source 16*b*, EuBr is set. Also, the base material evaporation source 16*a* is set so that the inflow direction of a metal vapor points to a middle area sandwiched by the central area AR1 and the peripheral area AR2. The activator evaporation source 16*b* is set so that that the inflow direction of a metal vapor becomes parallel to the central axis AX and positions out of the support body 100. In the case where the base material evaporation source 16*a* and the activator evaporation source 16*b* are thus arranged as well, similar to the manufacturing apparatus 10 shown in FIG. 6, it is possible to control the Eu concentration (to provide a positive concentration gradient along the direction from the center to the periphery of the radiation converting film 200).

Figure 8A:
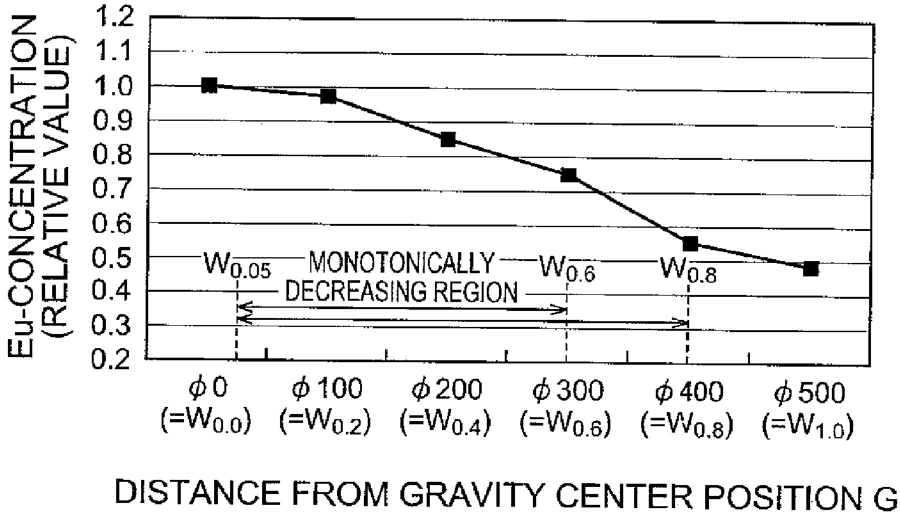
FIGS. 8A and 8B are graphs showing relationships of the Eu concentration (relative value) and the luminance (relative value) to the measuring position (distance from the gravity center position), with regard to prepared radiation image converting panels (radiation converting films) of Sample No. 1.
Figure 8B:
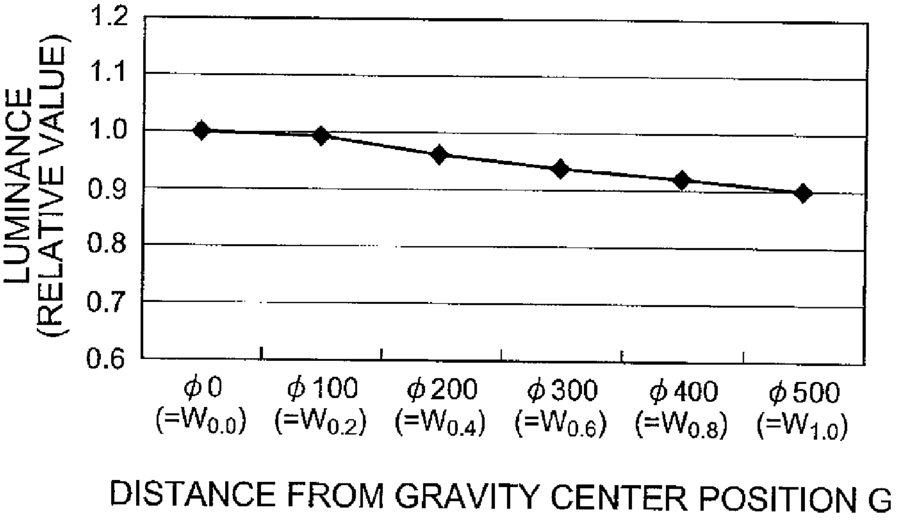
Figure 9A:
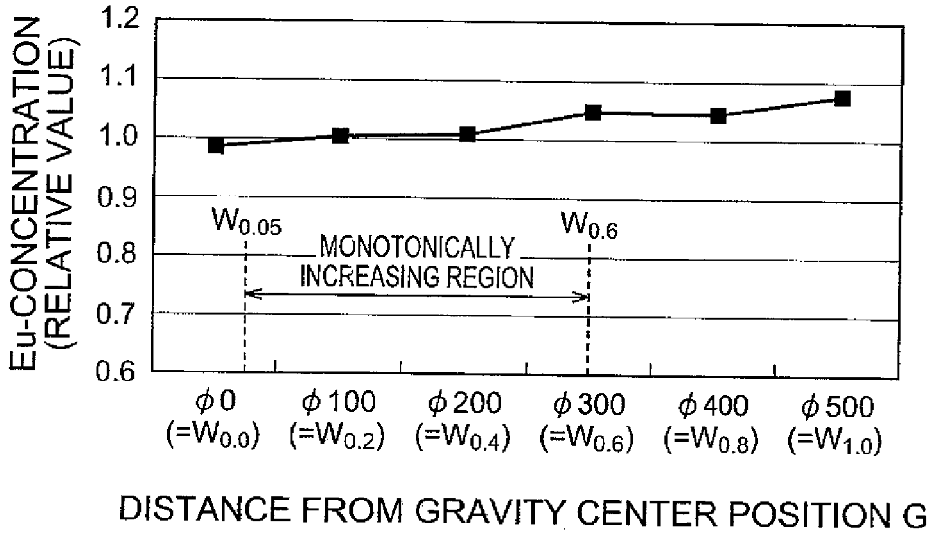
FIGS. 9A and 9B are graphs showing relationships of the Eu concentration (relative value) and the luminance (relative value) to the measuring position (distance from the gravity center position), with regard to prepared radiation image converting panels (radiation converting films) of Sample No. 2.
Figure 9B:
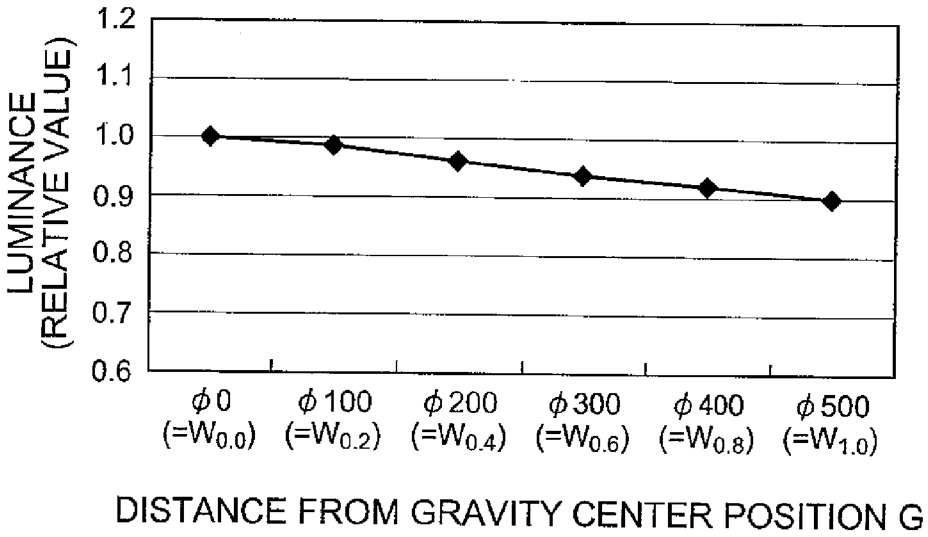
Figure 10A:
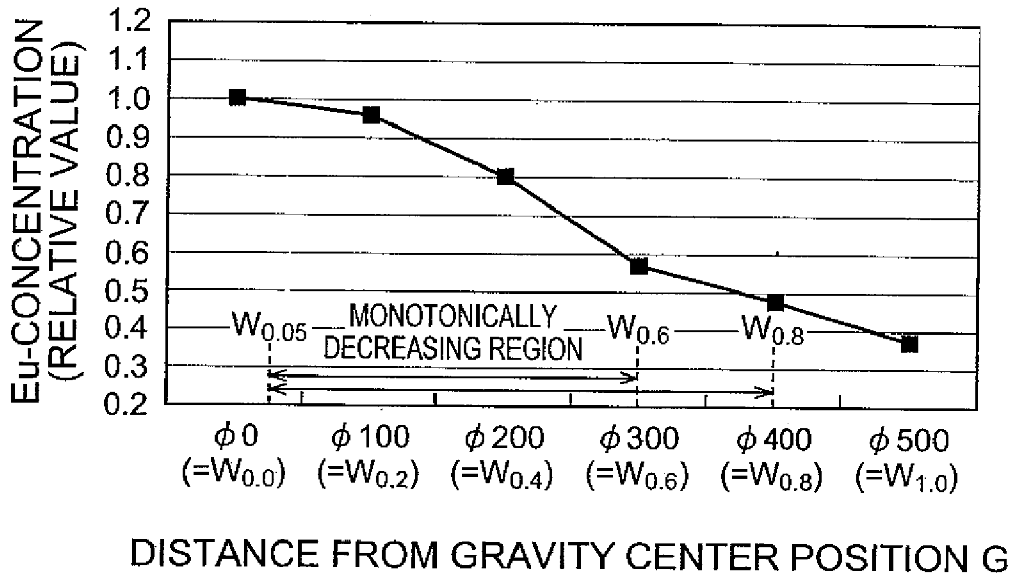
FIGS. 10A and 10B are graphs showing relationships of the Eu concentration (relative value) and the luminance (relative value) to the measuring position (distance from the gravity center position), with regard to prepared radiation image converting panels (radiation converting films) of Sample No. 3.
Figure 10B:
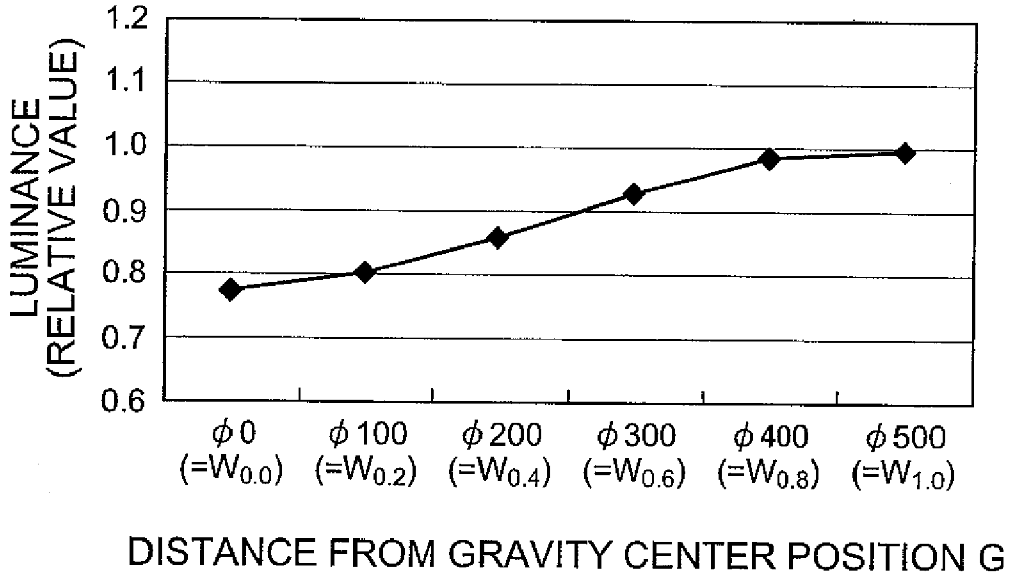

Next, regarding a plurality of Samples of the radiation converting film 200, the inventors examined respective relationships of an Eu concentration (relative value) and a luminance (relative value) to a distance from the center. FIGS. 8A and 8B are graphs showing relationships of the Eu concentration (relative value) and the luminance (relative value) to the measuring position (distance from the gravity center position), with regard to prepared radiation image converting panels (radiation converting films) of Sample No. 1. FIGS. 9A and 9B are graphs showing relationships of the Eu concentration (relative value) and the luminance (relative value) to the measuring position (distance from the gravity center position), with regard to prepared radiation image converting panels (radiation converting films) of Sample No. 2. FIGS. 10A and 10B are graphs showing relationships of the Eu concentration (relative value) and the luminance (relative value) to the measuring position (distance from the gravity center position), with regard to prepared radiation image converting panels (radiation converting films) of Sample No. 3; and As can be seen from FIG. 8A, the radiation converting film of Sample No. 1 has an Eu concentration that falls within the optimal range at the film region located on the central area of the support body, and is provided with a negative Eu concentration gradient along the direction from the center to the periphery of the support body (first concentration distribution pattern). Such a radiation converting film of Sample No. 1, as shown in FIG. 8B, has a luminance distribution gradually decreasing from the panel center toward the panel periphery. Sample No. 1 having such a first concentration distribution pattern is prepherable when pointing up the panel center. Furthermore, in the case that a transparent moisture-resistant protective film is formed on a surface of Sample No. 1, a luminance distribution that becomes flat over the region of the panel center toward the panel periphery can be realized.

The radiation converting film of Sample No. 2, as shown in FIG. 9A, 15 has an Eu concentration that falls within the optimal range at the film region located on the central area of the support body, and is provided with a positive Eu concentration gradient from the panel center toward the panel periphery (second concentration distribution pattern). Such a radiation converting film of Sample No. 2, as shown in FIG. 9B, also has a luminance distribution gradually decreasing from the panel center toward the panel periphery. Sample No. 2 having such a second concentration distribution pattern is preferable when pointing up the vicinity of panel center.

Figure 11:
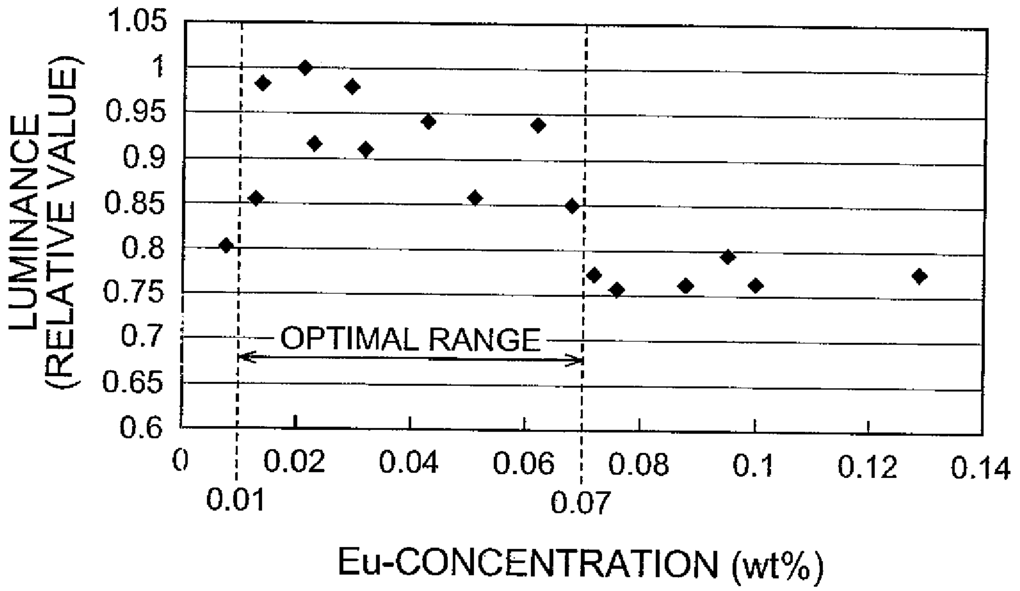
FIG. 11 is a graph showing relationship between the Eu concentration (wt %) and the luminance (relative value).

Furthermore, the radiation converting film of Sample No. 3, as shown in FIG. 10A, has an Eu concentration that falls within the optimal range at the film region located on the peripheral area of the support body, and is provided with a negative Eu concentration gradient from the panel center toward the panel periphery (third concentration distribution pattern). Such a radiation converting film of Sample No. 3, as shown in FIG. 10B, also has a luminance distribution gradually increasing from the panel center toward the panel periphery. Sample No. 3 having such a third concentration distribution pattern is prepherable when pointing up the panel periphery. In addition, in the case that a transparent moisture-resistant protective film is formed on a surface of Sample No. 3, a luminance distribution that becomes flat over the region of the panel center toward the panel periphery can be realized Subsequently, the inventors examined an optimal range of Eu as an activator. FIG. 11 is a graph showing relationship between the Eu concentration (wt %) and the luminance (relative value).

As can be seen from FIG. 11, in the range of 0.01 wt % to 0.07 wt %, a sufficient luminance can be obtained. By providing the radiation converting film with a positive or negative concentration gradient with reference to the film region that is set at the optimal range, a luminance distribution of an entire panel after formation of a moisture-resistant protective film can be arbitrarily controlled.

In accordance with the radiation image converting panel according to the present invention, the Eu concentration distribution added into the radiation converting film is set at various concentration distribution patterns having a concentration gradient long the direction from the vicinity of central area toward the peripheral area of the radiation converting film. By selecting one of such various Eu concentration distribution patterns according to an intended purpose, a luminance distribution of the entire radiation image converting panel after formation of a moisture-resistant protective film covering the radiation converting film can be arbitrarily controlled.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A method of fabricating a radiation image converting panel, comprising the steps of:

preparing a supporting body having a first main surface, in which a film forming region including at least a gravity center position of said first main surface exists, and a second main surface opposing said first main surface;

preparing a first evaporation source holding a first metal material comprised of at least a base material for forming a radiation converting film and a second evaporation source holding a second metal material comprised of at least an activator material containing Eu;

placing said support body on a surface of a holder rotatable about a predetermined axis orthogonal to said surface of said holder while the gravity center position of said first main surface is positioned on the predetermined axis;

allocating said first and second evaporation sources such that a radiation converting film, to be formed on said film forming region of said first main surface, has a positive or negative Eu concentration gradient in a middle area sandwiched by a central area and a peripheral area, said central area being around the gravity center position whose radius equals 5% or less of a minimum distance from the gravity center position to the edge of said film forming region, said peripheral area being sandwiched by an edge of the film forming region and a circumference of a reference circle centering the gravity center position whose radius equals 40% or more but 80% or less of the minimum distance from the gravity center position to the edge of the film forming region; and forming said radiation converting firm, which is comprised of columnar crystals which are coincident or tilted at a predetermined angle with respect to a normal direction of said first main surface, on said film forming region of said first main surface, by individually introducing the metal vapor from said first evaporation source and the metal vapor from said second evaporation source onto said film forming region of said first main surface while rotating said support body about the predetermined axis.

2. A method according to claim 1, further comprising the step of:

forming a moisture-resistant protective film on said radiation converting film so as to cover an exposed surface of said radiation converting film, excluding a surface of said radiation converting film that is covered by said first main surface of said support body.

3. A method according to claim 1, wherein the first metal material of said first evaporation source further includes the activator material containing Eu and the second metal material of said second evaporation source further includes the base material for forming said radiation converting film, while the Eu concentration in the first metal material is lower than that in the second metal material, and wherein said first evaporation source locates such that the inflow direction of the metal vapor from said first evaporation source points to the peripheral area, and said second evaporation source locates such that the inflow direction of the metal vapor from said second evaporation source points to the central area.

4. A method according to claim 1, wherein said first evaporation source locates such that the inflow direction of the metal vapor from said first evaporation source points to the middle area, and said second evaporation source locates such that the inflow direction of the metal vapor from said second evaporation source points to the central area.

5. A method according to claim 1, wherein the first metal material of said first evaporation source further includes the activator material containing Eu and the second metal material of said second evaporation source further includes the base material for forming said radiation converting film, while the Eu concentration in the first metal material is lower than that in the second metal material, and wherein said first evaporation source locates such that the inflow direction of the metal vapor from said first evaporation source points to the central area, and said second evaporation source locates such that the inflow direction of the metal vapor from said second evaporation source points to the peripheral area.

6. A method according to claim 1, wherein said first evaporation source locates such that the inflow direction of the metal vapor from said first evaporation source points to the middle area, and said second evaporation source locates such that the inflow direction of the metal vapor from said second evaporation source becomes parallel to the predetermined axis and positions out of said support body.

7. A radiation image converting panel fabricated by a method according to claim 1, wherein the Eu concentration falls within the range of 0.01 wt % or more but 0.5 wt % or less, over said entire radiation converting film, wherein, in said film forming region of said first main surface, the Eu concentration of said radiation converting film, which locates on said central area, is set so as to fall within an optimal range of 0.01 wt % or more but 0.07 wt % or less, and the Eu concentration of said radiation converting film, which locates on said peripheral area, is set so as to become lower than the Eu concentration of said radiation converting film which locates on said central area, and wherein, in said film forming region of said first main surface, the Eu concentration distribution, which locates on said middle area, monotonically decreases along a direction directing from the gravity center position to the edge of said film forming region.

8. A radiation image converting panel according to claim 7, wherein the Eu concentration of said radiation converting film locating on said peripheral area is 0.3 times or more but 0.8 times or less of the Eu concentration of said radiation converting film locating on said central area.

9. A radiation image converting panel according to claim 7, wherein the Eu concentration falls within the range of 0.01 wt % or more but 0.3 wt % or less, over said entire radiation converting film.

10. A radiation image converting panel fabricated by a method according to claim 1, wherein the Eu concentration falls within the range of 0.01 wt % or more but 0.5 wt % or less, over said entire radiation converting film, wherein, in said film forming region of said first main surface, the Eu concentration of said radiation converting film, which locates on said central area, is set so as to fall within an optimal range of 0.01 wt % or more but 0.07 wt % or less, and the Eu concentration of said radiation converting film, which locates on said peripheral area, is set so as to become higher than the Eu concentration of said radiation converting film which locates on said central area, and wherein, in said film forming region of said first main surface, the Eu concentration distribution, which locates on said middle area, monotonically increases along a direction directing from the gravity center position to the edge of said film forming region.

11. A radiation image converting panel according to claim 10, wherein the Eu concentration falls within the range of 0.01 wt % or more but 0.3 wt % or less, over said entire radiation converting film.

12. A radiation image converting panel fabricated by a method according to claim 1, wherein the Eu concentration falls within the range of 0.01 wt % or more but 0.5 wt % or less, over said entire radiation converting film, wherein, in said film forming region of said first main surface, the Eu concentration of said radiation converting film, which locates on said peripheral area, is set so as to fall within an optimal range of 0.01 wt % or more but 0.07 wt % or less, and the Eu concentration of said radiation converting film, which locates on said central area, is set so as to become higher than the Eu concentration of said radiation converting film which locates on said peripheral area, and wherein, in said film forming region of said first main surface, the Eu concentration distribution, which locates on said middle area, monotonically decreases along a direction directing from the gravity center position to the edge of said film forming region.

13. A radiation image converting panel according to claim 12, wherein the Eu concentration falls within the range of 0.01 wt % or more but 0.3 wt % or less, over said entire radiation converting film.

* * * * *